March 3, 1964     A. B. SEGUR     3,122,780
POULTRY MEAT REMOVAL METHOD
Filed Dec. 30, 1960     2 Sheets-Sheet 1
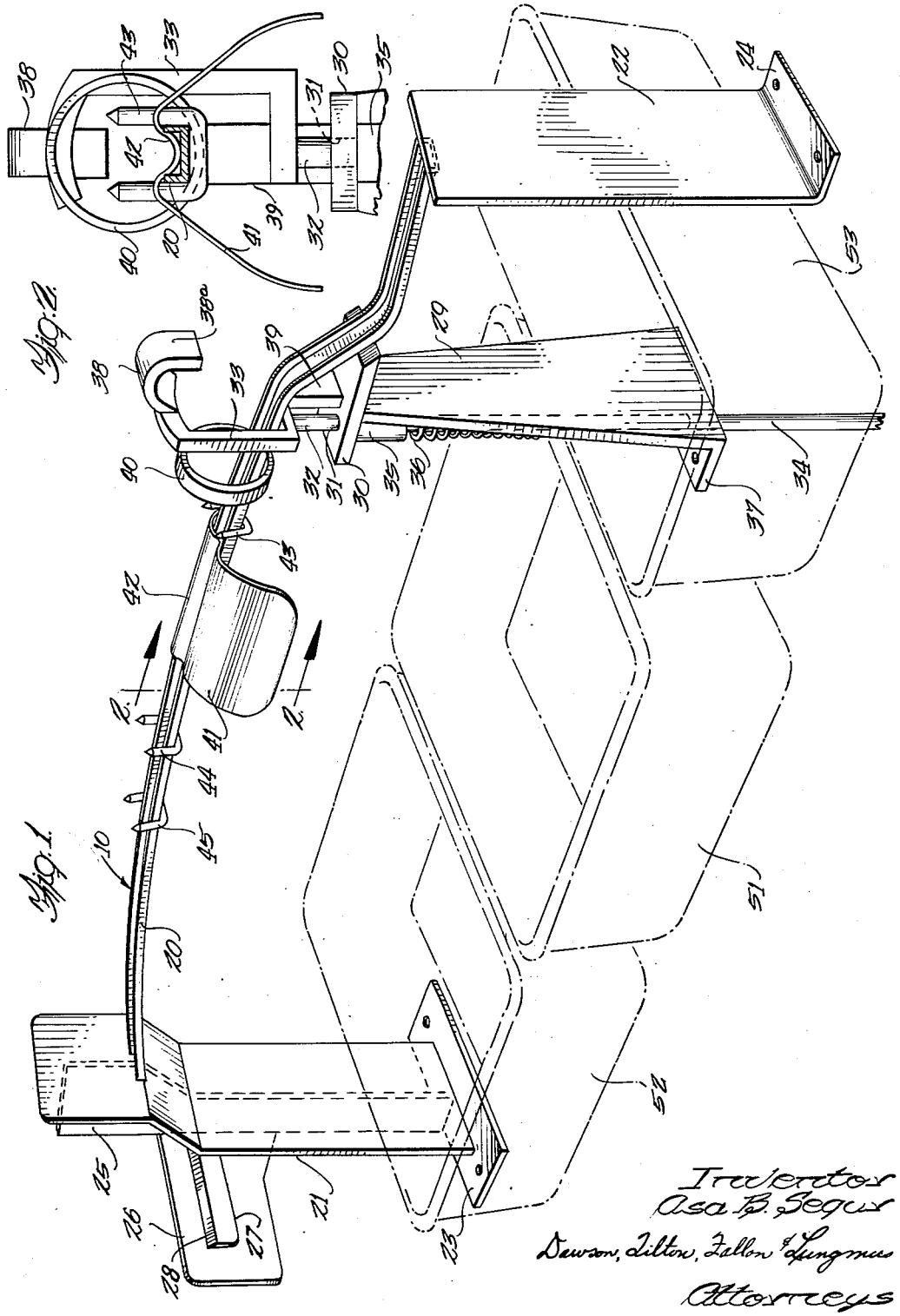

March 3, 1964  A. B. SEGUR  3,122,780
POULTRY MEAT REMOVAL METHOD
Filed Dec. 30, 1960  2 Sheets-Sheet 2
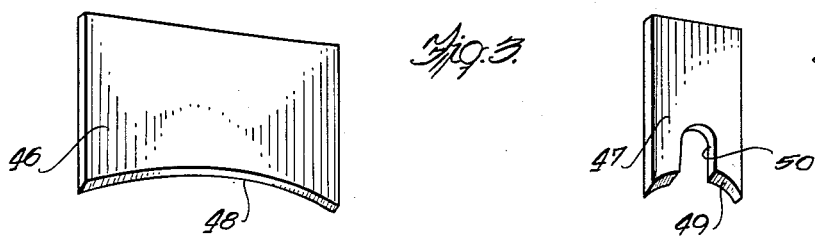
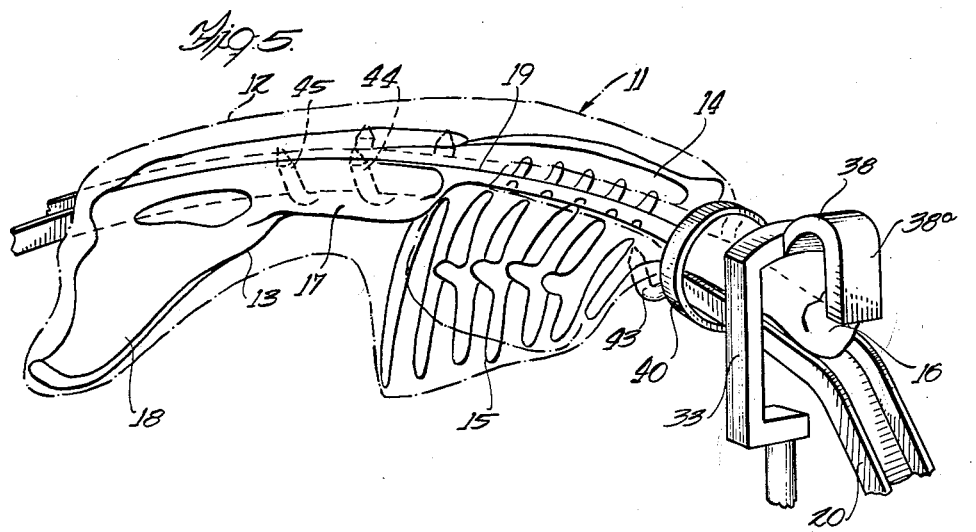
Inventor
Asa B. Segur
Dawson, Tilton, Fallon & Lungmus
Attorneys United States Patent Office 3,122,780
Patented Mar. 3, 1964

3,122,780
POULTRY MEAT REMOVAL METHOD
Asa B. Segur, 1185 S. Ridgeland Ave., Oak Park, Ill.
Filed Dec. 30, 1960, Ser. No. 79,638
7 Claims. (Cl. 17—45)

This invention relates to a meat removal method and apparatus and, more specifically, to a method and apparatus for the removal of meat from the back sections of poultry carcasses.

In my co-pending application Serial No. 27,093, filed May 5, 1960, I disclose a method and apparatus for dismembering and breaking apart poultry carcasses so that uniformity of procedure and a high speed of subsequent meat removal may be readily achieved. While the subject matter of the present application might be useful in the removal of meat from various carcass sections of different shapes and sizes, it relates particularly to the method and apparatus for the removal of meat from the back sections of poultry carcasses that have been broken apart following the teachings of the aforementioned co-pending application.

An important object of the present invention is to provide a method and apparatus for rapidly and efficiently removing the meat from poultry carcass sections, such method and apparatus being especially suited for use in commercial poultry processing plants where meat is removed from poultry carcasses for later use in the preparation of soups, meat pies, frozen dinners and the like. Another object is to provide a method and apparatus whereby an operator may quickly and easily remove meat from a poultry carcass section, such as a back section, by using only one hand, or, by using both hands, may remove the meat from two back sections at once. A further object is to provide a method and apparatus for separating the meat and bones of poultry sections, the removal of meat occurring in such a way as to permit the segregation of meat of different quality taken from such sections. A still further object is to provide a method and fixture for the removal of meat from the back sections of poultry carcasses so that the meat tends to come off in relatively large pieces or chunks rather than in the shredded fashion common in ordinary meat removal procedures.

Other objects will appear from the specification and drawings in which:

FIGURE 1 is a perspective view of a fixture embodying the present invention;

FIGURE 2 is an enlarged vertical sectional view taken along line 2—2 of FIGURE 1 but showing the clamping member in lowered position.

FIGURE 3 is a perspective view of a scraper adapted to be used in the method of the present invention;

FIGURE 4 is a perspective view of a second scraper;

FIGURE 5 is an enlarged (over FIGURE 1) broken perspective view illustrating the orientation of a poultry back section upon the fixture.

Referring to the drawings, the numeral 10 generally designates a fixture for supporting the back section of a poultry carcass. Such a section is indicated by the numeral 11 in FIGURE 5. Broken line 12 represents the outline of the meat and skin of the section while the solid lines generally indicate the skeletal configuration of the section.

While a detailed discussion of the back skeleton is believed unnecessary, a general statement regarding the basic components will be made to permit a fuller understanding of the invention. The back skeleton essentially comprises synsacrum 13, thoracic vertebrae 14, vertebral ribs 15, and cervical vertebrae 16. The synsacrum consists of ankylosed lumbar, sacral and coccygeal vertebrae and also includes the fused ilium 17 and ischium 18. Along the dorsal side of the back skeleton is a dorsal spine 19.

The fixture comprises an arched bar 20 of channel-shaped cross section secured at its ends to a pair of supporting standards 21 and 22. The respective standards are provided with base portions 23 and 24 which are adapted to be bolted or otherwise secured to a supporting surface or stand. As shown in FIGURE 1, the standards are formed from sheet stock and rear standard 21 is provided with a rearwardly extending vertical reinforcing plate 25. A laterally projecting stop plate 26 is secured to or formed integrally with the reinforcing plate 25 and is spaced directly behind a laterally-extending blade 27 secured to standard 21. Blade 27 has an upwardly facing cutting edge 28 and, like stop member 26, is rigidly secured to the rear standard assembly.

The longitudinally curved bar 20 is also supported by an intermediate standard 29 which is likewise adapted to be secured to a supporting surface or stand. Adjacent the upper end of the standard is a horizontal support plate 30 apertured at 31 for slidably receiving the shank 32 of a generally C-shaped clamping member 33. Shank 32 is connected to the upper end of a vertical operating shaft 34 by means of a connecting sleeve 35. As indicated in FIGURES 1 and 2, sleeve 35 performs the additional function of limiting the extent of upward movement of the clamping member 33 by abutting the under surface of support plate 30 and, in addition, constitutes the bearing member against which a helical compression spring 36 applies an upward force. The spring extends about shaft 34 between sleeve 35 and the base portion 37 of standard 29 and urges the C-shaped member 33 into the raised position shown in FIGURE 1.

In front of the arched upper portion of the clamping member 33 and rigidly affixed thereto is a stop member 38. In FIGURES 1 and 5 it will be observed that the stop member has a depending portion 38a spaced in front of the opening of the C-shaped member for blocking or limiting forward movement of a poultry carcass placed upon the fixture, as will be described in detail hereinafter.

Between support member 30 and the under surface of the arched bar 20 is an extension element 39 which is welded or otherwise secured to the bar and support member. Similarly, the inclined front edge of the support member 30 may be secured as by welding to the bar 20. It will be observed that the curvature of the bar changes abruptly adjacent standard 29 and slopes downwardly and forwardly in front of extension element 39. After passing downwardly beneath support member 30, the channel-shaped bar then turns in a horizontal direction and abuts standard 22.

Shaft 34 is adapted to be lowered against the upward force of spring 36 by any suitable actuating means such as, for example, an actuating pedal (not shown) disposed beneath the fixture. Alternatively, the operating shaft might be associated with a suitable lever assembly so that as an operator leans against the lever the clamping member 33 is forced downwardly. Whatever the means may be for lowering the operating shaft 34, it will be noted that the transverse upper portion of the clamping member 33 moves downwardly into a position spaced more closely to the channel bar 20 as the operating shaft descends.

Spaced behind the clamping member 33 is a ring 40. The ring has its inner surface welded or otherwise secured to the under surface of the channel bar 20 and has its opening in register with the opening defined by the C-shaped clamping member. Ring 40 has an inner diameter large enough to receive the neck portion of a fowl, as will be brought out more fully hereinafter.

Behind the ring 40 and also mounted upon the channel bar 20 is a saddle 41. The side portions of the saddle curve downwardly and laterally while the central portion of the saddle dips downwardly into the channel defined by bar 20. The saddle is welded or otherwise secured to the bar and is shaped to conform closely to the under surface contour of the back section adjacent the thoraco-lumbar region and the vertebral ribs 15. Thus, the longitudinal groove 42 along the top side of the saddle receives the ventral spine and ventral vertebral enlargements of the back section and also provides direct support for the vertebral ribs in the dorsolateral thoracic region of the carcass section. In FIGURE 5, it will be seen that the downwardly and laterally curved ribs 15 rest upon the curved saddle and that the neck of the carcass section projects forwardly through ring 40 and beneath the transverse portion 39 of clamping member 33.

Between the saddle and the ring are a pair of upstanding barbs or nails 43 having sharply pointed upper ends. Similarly, behind the saddle are two longitudinally-spaced pair of barbs or nails 44 and 45. Each pair may be portions of a single U-shaped element having an intermediate portion passing beneath and welded or otherwise secured to the under surface of the channel bar 20 as indicated in FIGURE 2. Nails 43 are adapted to anchor against the bone structure of the back on opposite sides of the vertebral column adjacent the front end of the thoracic region while nails 44 and 45 engage the transverse processes on each side of the ventral spine of the sacral vertebrate to lock the synsacrum against lateral movement upon the arched channel bar.

FIGURES 3 and 4 illustrate two types of scrapers 46 and 47 which may be used in removing meat from a back section supported upon fixture 10. Scraper 46 has a gradually curved edge portion 48 while scraper 47 is narrower and has a sharply curved bottom edge 49 which is centrally notched at 50 to receive the dorsal spinal processes of the back as will be described shortly.

In the use of the invention described above it is preferred that an operator remove meat from two back sections at the same time and, for this purpose, a pair of fixtures 10 should be mounted in spaced side-by-side relation so that the carcass sections supported by the two fixtures may be easily reached with both hands of the worker. Since the structure and operation of each of a pair of fixtures are identical, the use of only one such fixture will now be described.

Ordinarily the back section of a carcass which has been broken apart in the manner disclosed in my copending application Serial No. 27,093, or in any other suitable manner, will include a short tail portion containing the urostilus and the uropygial gland. The connection between this tail portion and the rest of the back section may be effectively weakened for subsequent removal of the tail portion by holding a carcass section so that the tip of the tail contacts the front side of stop plate 26 and then rotating the carcass section so that the connection between the tail and the remainder of the body section is partially severed by blade 28. More specifically, the carcass section should be held ventral side up and along a line parallel with bar 20. By then rotating the back section with the tip of the tail in contact with stop plate 26, the lateral muscular attachments for the tail and the neck of the uropygial gland are cut by the blade.

Thereafter, the carcass section is placed upon the arched bar 20 and saddle 41 with the neck portion 16 projecting forwardly through the neck break-off ring 40 and beneath (and in contact with) the transverse portion of clamping member 33 and with the end of the neck abutting the depending portion of stop 38. The foot treadle or other means for lowering the clamping member is actuated so that the neck portion of the carcass is securely clamped by member 33 within the channel bar and the stop 38 positively limits forward movement of the carcass section. Nails 43, 44 and 45 also assist in anchoring the section against longitudinal as well as transverse movement.

With the back section locked in position, the operator, using one hand, breaks off the tail portion of the carcass and discards it. The carcass then assumes the appearance illustrated in FIGURE 5 of the drawings. Since the section is firmly anchored in position, the skin and meat may be readily removed using one hand. It has been found that wire mesh gloves are highly effective in removing the skin and meat from the back skeleton and, where such gloves are used, no additional scrapers or cutting devices are necessary. Alternatively, the skin and meat may be removed by using scrapers of the type shown in FIGURES 3 and 4. Scraper 46 has a blade 48 of a contour which generally fits the shape of the back section and, by using such a scraper, a worker may loosen the skin of the back starting at the rear end thereof. If a wire mesh glove is worn, the loosening of the skin may be accomplished without the use of such a scraper. In either case, the skin, having been loosened, is lifted forwardly and upwardly and is pulled from the back and deposited in a suitable pan.

The operator, standing behind the fixture, then removes the exposed meat along the dorsal spine 19 of the back section. Here again, this may be accomplished either by wire mesh gloves (using the thumb and index finger) or by a tool such as scraper 47. The slot 50 of this scraper receives the dorsal spine 19 and permits the scraping edge portions 49 to sink into the meat betwen the spine and the ridges of the transverse processes. By urging scraper 47 forwardly along the dorsal spine, the meat along the center line of the synsacrum and thoracic vertebrae is removed. The meat so removed is placed, or permitted to fall, into a suitable pan 51.

Following removal of the meat from along the spine, the operator then presses downwardly and outwardly to remove the meat from the vertebral rib cage 15. Saddle 41 supports the rib cage and prevents the ribs from breaking free from the vertebral column. As before, the meat is allowed to drop downwardly into pan 51.

A similar step is performed to remove the meat from the region of the synsacrum 13. The operator places his hand so that his fingers straddle the synsacrum and, as his hand is forced downwardly and forwardly the meat is urged therefrom and drops into pan 52.

After the meat has been cleaned from the portion of the carcass disposed above and behind saddle 41, the operator grips the rear portion of the carcass and, with the clamping member 33 in lowered or clamping position, lifts the carcass to break it apart at the junction of the cervical and thoracic vertebral regions. In other words, the carcass is broken apart directly in front of the rib cage and behind ring 40, the ring serving to prevent upward movement of the neck portion 16 and to insure a clean break betwen the body portions. The back skeleton is discarded and, upon release of the treadle or other actuating means, spring 36 urges the clamping and stop members into raised positions to release the neck portion of the carcass and permit it to fall downwardly and forwardly into pan 53.

While in the foregoing I have disclosed the method and apparatus of the present invention in considerable detail for purposes of illustration, it will be understood by those skilled in the art that many of these details may be varied without departing from the spirit and scope of the invention.

I claim:

1. A method for removing meat from poultry carcass sections comprising the steps of placing a back section of a poultry carcass upon a rigid support, anchoring the neck portion of said carcass section upon said support to hold the entire section stationary thereon, stripping the skin and meat from the body portion of said carcass section while the same is anchored on said support, lifting the body portion to separate the same from the anchored neck portion, and thereafter releasing said neck portion.

2. A method for removing meat from poultry carcass sections comprising the steps of locating a poultry carcass section upon a rigid support and with the neck portion thereof against a stop, anchoring said neck portion against upward movement on said support, stripping meat from the section while the same is secured on the support, and thereafter lifting the rear portion of said carcass section to break the same way from the anchored neck portion thereof.

3. The method of claim 2 in which there is the further step of releasing said neck portion from said support after said neck portion has been broken away from the remainder of said carcass section.

4. The method of claim 2 in which said stripping step includes segregating meat removed from different portions of said carcass section.

5. A method for removing meat from the back sections of poultry carcasses comprising the steps of slicing a back section of a poultry carcass about the connection between the body and tail thereof, placing said back section upon a rigid support and simultaneously anchoring the same against horizontal and vertical movement thereon, and thereafter removing the meat from said back section while the same is anchored upon said support, said removal step including pulling said tail from the body portion of said carcass section, peeling the skin forwardly from said section, and urging the meat from the bones thereof.

6. A method for removing meat from poultry carcass sections comprising the steps of positioning a poultry carcass section upon a rigid support with the outer surface of said section facing upwardly and the inner surface thereof facing downwardly, simultaneously anchoring said section against lateral and downward movement and bracing the undersides of the skeletal components thereof to protect said components against flexure and breakage, and thereafter peeling the skin and stripping the meat from the upwardly facing side of said section while said section is anchored and braced upon said support.

7. In a method for removing meat from the back sections of poultry carcasses, the steps comprising anchoring a back section of a poultry carcass upon a rigid support and simultaneously bracing the skeletal components of said section against flexure and breakage, and thereafter peeling the skin and stripping the meat from the outer side of said back section while said section is anchored and braced upon said support.

References Cited in the file of this patent
UNITED STATES PATENTS

| | | |
|---|---|---|
| 2,633,601 | Snyder | Apr. 7, 1953 |
| 2,793,392 | Cutrera | May 28, 1957 |
| 2,844,844 | Sieczkiewicz | July 29, 1958 |
| 2,897,536 | Bergstrom et al. | Aug. 4, 1959 |
| 2,978,739 | Goldberg | Apr. 11, 1961 |